United States Patent [19]

Garretson

[11] 4,267,802
[45] May 19, 1981

[54] FUEL VAPORIZATION AND DELIVERY SYSTEM

[75] Inventor: Delmar J. Garretson, Mineral Springs, Ark.

[73] Assignee: Gordon O. Dodson, Texarkana, Ark.

[21] Appl. No.: 944,334

[22] Filed: Sep. 21, 1978

[51] Int. Cl.³ .......................................... F02M 31/00
[52] U.S. Cl. .................................. 123/523; 123/557; 261/144; 261/145
[58] Field of Search ................... 123/133, 134, 122 E, 123/34 A, 141, 122 A; 261/145, 144, 119, 79 R, 115, 118

[56] References Cited

U.S. PATENT DOCUMENTS

| | | | |
|---|---|---|---|
| 1,121,868 | 12/1914 | Riohe et al. | 123/122 A |
| 1,255,077 | 1/1918 | Brown | 261/79 R |
| 1,260,388 | 3/1918 | Johnean | 123/122 A |
| 1,365,651 | 1/1921 | Beaumont | 123/133 |
| 1,583,584 | 5/1926 | Donning | 123/122 A |
| 1,591,331 | 7/1926 | Linebarger | 261/115 |
| 2,402,080 | 6/1946 | Randall | 123/133 |
| 2,659,667 | 11/1953 | Bosdet | 123/141 |
| 2,882,882 | 4/1959 | Pantano | 123/122 E |
| 2,996,290 | 8/1961 | Munden | 123/141 |
| 4,089,314 | 5/1968 | Bernecker | 123/133 |
| 4,106,457 | 8/1978 | Totten | 123/133 |

FOREIGN PATENT DOCUMENTS 340211 9/1959 Fed. Rep. of Germany ...... 261/118

*Primary Examiner*—Ronald H. Lazarus
*Attorney, Agent, or Firm*—Arnold, White & Durkee

[57] ABSTRACT

A fuel delivery system for an internal combustion engine, including a vaporizing chamber for combining liquid fuel and air to produce a vaporized fuel and air mixture, a vapor expander which communicates with the chamber for expanding and further vaporizing the mixture, and a metering device which communicates with the expander and with the engine for supplying engine vacuum to the system and controlling the amount of the mixture which is supplied to the engine. The vaporizing chamber includes a reservoir for storing a quantity of liquid fuel, an air inlet, a jet which sprays liquid fuel into the chamber, and a reservoir heater which heats the liquid fuel in the reservoir. The vapor expander includes a tubular passage communicating between the chamber and the metering device and a heating conduit coiled around the tubular passage to carry heated engine coolant and transfer heat to the mixture. The vapor expander also includes a plurality of perforated baffles mounted within the tubular passage to further promote the transfer of heat to and the vaporization of the mixture. The metering device includes an air inlet for providing additional air to the mixture, a mixture outlet for conveying the mixture to the engine, a venturi chamber between the inlet and the outlet for increasing the velocity of flow of the mixture, a choke valve mounted within the air inlet and adapted to control the flow of air through the inlet, a mixture inlet opening into the venturi chamber and adapted to communicate with the vapor expander, and a mixture control valve to regulate the amount of the mixture conveyed to the engine.

4 Claims, 6 Drawing Figures

FUEL VAPORIZATION AND DELIVERY SYSTEM

BACKGROUND OF THE INVENTION

This invention relates to internal combustion engines and, more particularly, to fuel delivery devices for such engines.

Internal combustion engines are widely used in industry and for providing motive power for many of the transportation devices utilized in developed societies, such as automobiles, trucks, farm machinery, and other vehicles. Most such engines use hydrocarbon fuels, such as gasoline, to supply energy for their operation. Because of the increasing awareness that the hydrocarbon resources of the world are depleting, it has become increasingly necessary to improve the operation of such power plants to provide the most efficient use of fuel possible. In addition, increasing concern has developed with respect to the environmental consequences of energy producing systems. Because of this concern, the polluting byproducts of the internal combustion process must be minimized in order to preserve the environment and the health of its inhabitants.

The operation of an internal combustion engine may be conveniently described by reference to the operating steps utilized in a typical four-stroke automobile engine which runs on gasoline fuel. In such an engine, the first stroke is the intake stroke, in which the piston is drawn downwardly in the cylinder by the momentum of the engine. This downstroke creates a partial vacuum, which draws an air and fuel mixture into the combustion chamber through the intake manifold and the carburetor. In the compression stroke, the piston is forced upwards, causing the air and fuel mixture in the combustion chamber to be compressed, increasing its pressure and temperature. At the end of the compression stroke, the mixture is ignited by a spark plug in the power stroke, and the resulting increase in pressure caused by the burning air and fuel mixture forces the piston down, transferring the energy of combustion into rotary motion through the connection between the piston and the crankshaft. Finally, in the exhaust stroke, the remaining byproducts of the combustion process are forced out of the combustion chamber and exhausted from the engine.

The carburetor, which is used in typical internal combustion engine designs, performs an important function in the intake stroke of the engine. The carburetor is provided to supply a suitable combustible mixture for the engine by combining intake air and liquid gasoline in the correct proportions. In order to perform this function, the operation of the carburetor depends on the partial vacuum which is created during the intake stroke of the engine. This partial vacuum draws outside air into the throat of the carburetor. Within the carburetor throat are located metering jets connected to a fuel chamber which contains a quantity of gasoline. The partial vacuum, aided by a venturi within the carburetor, causes fuel to be drawn out of the metering jets and sprayed into the incoming air stream. This fuel and air mixture is then drawn out of the carburetor, through the intake manifold, and into the combustion chambers of the engine, where it is ignited during the ignition stroke.

Ideally, the fuel in the mixture which is provided to the engine should be completely vaporized to achieve the best possible combustion during the ignition cycle of the engine. Due to the design of carburetors known in the art, however, the fuel in this mixture is only partially vaporized when it leaves the carburetor and enters the combustion chambers. This partial vaporization achieved in typical carburetor systems is believed to be detrimental to the optimum performance of the engine in terms of the efficient and pollution free operation of that engine.

An engine which is supplied with a partially vaporized mixture is believed to run less efficiently than when the mixture is completely vaporized, resulting in less than the optimum gasoline mileage which might be obtained. In addition, the inefficient combustion which is believed to be caused in an engine when the fuel mixture is not completely vaporized may also result in excessive byproducts of the combustion process being exhausted from the engine, resulting in greater quantities of pollutants being released into the environment by the engine. Numerous other undesirable operating characteristics of an internal combustion engine are believed to be caused or aggravated by the operation of such an engine with a fuel and air mixture which is only partially vaporized, as in the operation of a conventional carburetor. Such other problems may include rough running of the engine, carbon buildup within the engine, dilution of the engine lubricating oil by liquid fuel running down the walls of the cylinders, excessive operating temperatures, engine stall, engine flood-out, and poor starting in cold weather conditions. Because of these limitations and others discussed above, which are caused by the carburetion systems known in the prior art, there has developed a need for a fuel preparation and delivery system which will provide an improved fuel mixture for internal combustion engines and enable such engines to operate more efficiently and with less polluting byproducts of combustion.

More specifically, it would be advantageous to provide such a fuel delivery system which is capable of producing a more completely vaporized fuel mixture which will significantly increase efficiency and reduce undesirable byproducts.

Additionally, it would be advantageous to provide a more efficient fuel delivery system for internal combustion engines which may be readily adapted to a wide variety of presently existing engine types and sizes.

It would also be advantageous to provide an improved fuel delivery system for internal combustion engines which is relatively simple and trouble free in operation.

SUMMARY OF THE INVENTION

It is a general object of this invention to provide a new and improved fuel preparation and delivery system for internal combustion engines.

In one embodiment, the invention includes a vaporizing chamber for combining liquid fuel and air to produce a vaporized fuel and air mixture and a metering device communicating with the chamber and with the engine for controlling the amount of the mixture which is supplied to the engine. The invention may also include a vapor expander interposed between the vaporizing chamber and the metering device for expanding and further vaporizing the mixture.

In a particular embodiment, the vaporizing chamber further includes a reservoir for storing a quantity of liquid fuel; an air inlet providing for the passage of air over the reservoir; a jet nozzle within the chamber communicating with a source of pressurized liquid fuel for spraying liquid fuel into the air and supplying liquid fuel to the reservoir, the passage of air over the reservoir and the spraying of the liquid fuel producing the fuel and air mixture; and a mixture outlet communicating with the vapor expander, thereby providing for the passage of the mixture to the vapor expander.

In a more particular embodiment, the vaporizing chamber may further include a reservoir heater affixed to the reservoir and adapted to transfer heat to the quantity of liquid fuel, thereby increasing the rate of vaporization of the liquid fuel. The heater may be adapted for the passage therethrough of liquid coolant from the internal combustion engine.

The vaporizing chamber may further include a float valve disposed within the reservoir and adapted to control the level of the liquid fuel contained therein.

The vaporizing chamber may also include a perforated baffle mounted within the outlet for promoting the additional vaporization of the mixture and the heating of the mixture.

In a more particular embodiment, the vaporizing chamber further comprises a first baffle disposed within the chamber between the air inlet and the nozzle, and a second baffle disposed within the chamber between the nozzle and the outlet, the baffles adapted to produce a swirling motion in the mixture, thereby promoting the vaporization of the fuel.

In another embodiment, the vapor expander includes a tubular passage communicating between the chamber and the metering device, and a heater attached to the passage for transferring heat to the mixture, thereby expanding and further vaporizing the mixture. The heater may further include a conduit adapted for the passage therethrough of heated liquid coolant from the internal combustion engine.

In a more particular embodiment, the vapor expander includes at least one perforated baffle mounted within the tubular passage and adapted to promote the transfer of heat to the mixture and the additional vaporization of the mixture.

In another embodiment, the metering device includes an air inlet for providing additional air to the mixture, a mixture outlet adapted to communicate with the engine for conveying the mixture to the engine, a venturi chamber communicating between the inlet and the outlet for increasing the rate at which the mixture is conveyed to the engine, a choke valve mounted within the air inlet and adapted to control the flow of air through the air inlet, a mixture inlet opening into the venturi chamber and adapted to communicate with the vapor expander, and a mixture control valve mounted within the mixture inlet and adapted to control the flow of the mixture into the venturi chamber.

In a more particular embodiment, the metering device may further include a first screen mounted within the mixture inlet, and a second screen mounted within the mixture outlet, the screens being adapted to prevent damage to the system arising due to backfires from the engine and to promote further vaporization of the mixture.

A method for delivering a vaporized fuel and air mixture to an internal combustion engine according to this invention includes the steps of:

1. drawing a quantity of air over a reservoir of liquid fuel to combine vapors from the fuel with the air in a vaporized fuel and air mixture,
2. spraying liquid fuel into the mixture to add additional fuel to the mixture,
3. heating the mixture to promote vaporization of the mixture,
4. combining the mixture with an additional amount of air, and
5. delivering the mixture to the combustion chambers of the engine through the intake manifold of the engine.

The method may include the additional steps of heating the reservoir of liquid fuel to promote the vaporization of the fuel, passing the mixture through a perforated baffle to promote the additional vaporization of the fuel, passing the mixture through a porous screen to isolate the mixture from the effects of engine backfire, or controlling the rate at which the mixture is delivered to the engine.

Examples of the more important features of this invention have thus been broadly outlined in order that the detailed description that follows may be better understood, and so that the contributions which this invention provides to the art may be better appreciated. There are, of course, additional features of the invention which will be described herein and which will be included within the subject matter of the claims appended hereto.

BRIEF DESCRIPTION OF THE DRAWINGS

Additional objects, features, and advantages of the present invention will become apparent by referring to the following detailed description of the preferred embodiments in connection with the accompanying drawings, wherein like reference numerals refer to like elements throughout all the figures. In the drawings.

DESCRIPTION OF THE PREFERRED EMBODIMENTS

Figure 1:
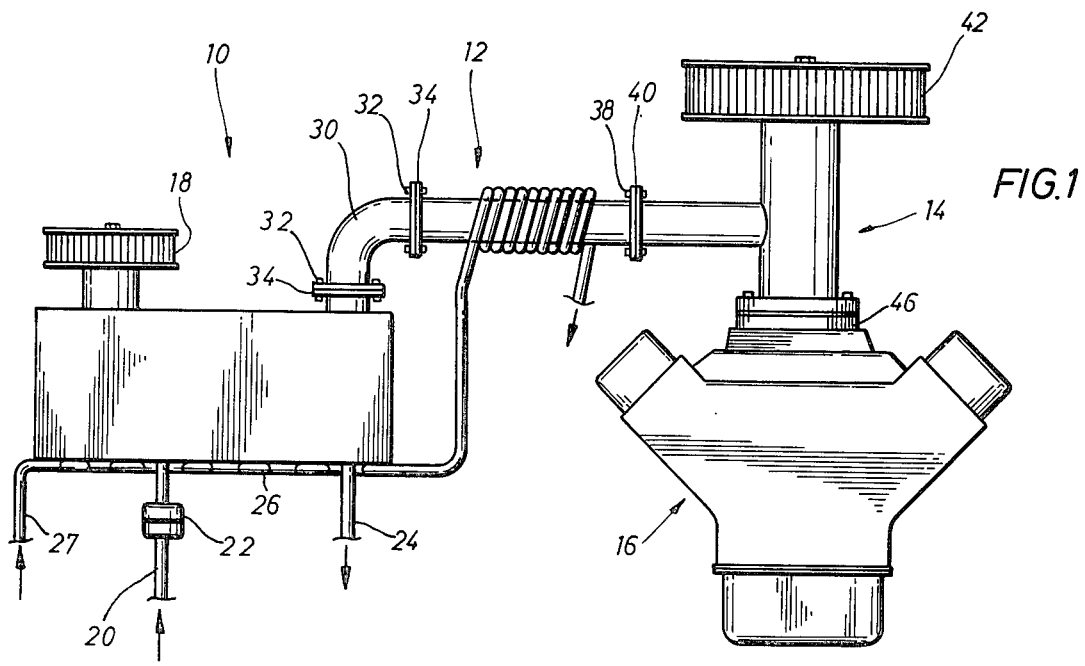
FIG. 1 is a side profile view illustrating one embodiment of the invention operably connected to a typical internal combustion engine.

Now referring first to FIG. 1, a side profile view of one embodiment of the invention is illustrated as it is utilized in conjunction with a typical internal combustion engine. A vaporizing chamber 10 is provided for combining liquid fuel and air to produce a vaporized fuel and air mixture. A vapor expander 12 communicates with the vaporizing chamber 10 and is utilized for heating and expanding and thus further vaporizing the mixture. A metering device 14 communicates with the vapor expander 12 and is attached to the engine 16 at the intake manifold through an adapter 46.

When the engine is running, the intake manifold vacuum created by piston action causes air to be drawn into the vaporizing chamber 10 through the air filter 18. This air is combined with liquid fuel within the vaporizing chamber 10 to produce a vaporized fuel and air mixture, as will be further described herein. Liquid fuel is supplied to the vaporizing chamber 10 through fuel inlet line 20, which passes through fuel filter 22 to remove any impurities in the liquid fuel. Excessive liquid fuel is drained from the vaporizing chamber 10 through fuel outlet line 24. The liquid fuel within the vaporizing chamber 10 is heated in the embodiment illustrated by means of the tubing 26, which is affixed to the bottom surface of the vaporizing chamber 10. The tubing 26 is connected to the cooling system of the engine 16 at an end 27, so that heated liquid coolant from the engine travels through the tubing, thereby transferring heat to the vaporizing chamber 10 and the liquid fuel contained therein, and thus increasing the rate of vaporization of the fuel. As will be apparent to those skilled in the art, however, other means of heating the liquid fuel within the vaporizing chamber may also be employed.

The fuel and air mixture passes out of the vaporizing chamber 10 and into the vapor expander 12 by means of a suitable coupling, such as the connector 30, which may be affixed to the vaporizing chamber 10 and the vapor expander 12 by any suitable fastening means, such as bolts 32 and flanges 34, which may contain gaskets therebetween to ensure effective sealing. The mixture then is drawn through the vapor expander 12, where it is further heated and vaporized due to the heat transferred to the vapor expander from the liquid coolant flowing through the tubing 26, which is coiled around the outer surface of the vapor expander 12. Although the vapor expander 12 is included in the preferred embodiment of this invention, it is not considered essential to the invention. Thus it would be possible to attain the benefits of this invention by connecting the vaporizing chamber 10 directly to the metering device 14.

From the vapor expander 12, the mixture is drawn into a metering device 14, which is connected to the vapor expander by a suitable fastening means, such as the bolts 38 and flanges 40, which may include a gasket therebetween to ensure an effective seal. In the metering device 14, the mixture is combined with additional external air, which enters the metering device through the air filter 42. A controlled amount of the vaporized fuel and air mixture is then drawn into the intake manifold of the engine 16, which may be connected to the metering device 14 by means of an adapter 46, the adapter permitting the metering device to be connected to engines of various sizes and configurations without redesigning or altering the metering device. In addition, however, metering devices of various sizes and configurations may be provided to adapt the present invention to engines with different operating characteristics.

Figure 2:
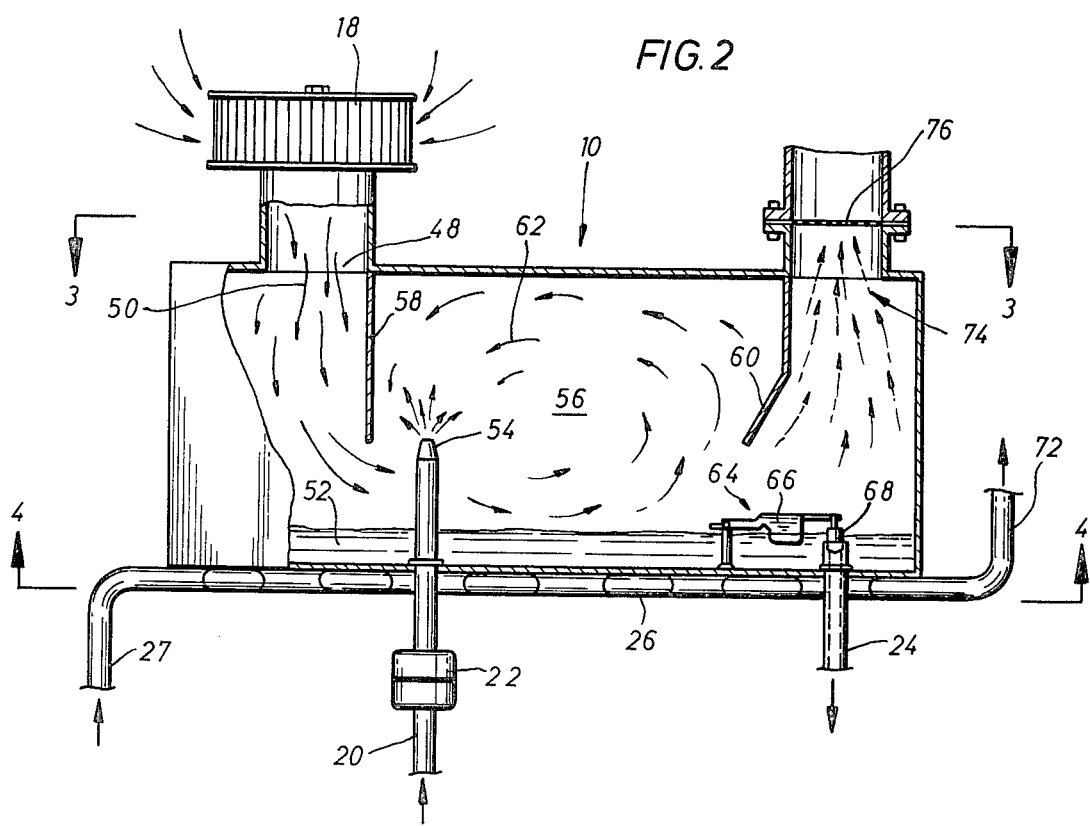
FIG. 2 is a side profile view in partial cut-away showing the vaporizing chamber of the embodiment illustrated in FIG. 1.

Now referring to FIG. 2 as well as FIG. 1, the vaporizing chamber 10 is shown in more detail in a partially cutaway side view in FIG. 2. The vaporizing chamber 10 is provided for initially mixing the fuel, air, and vapors which are to be delivered to the engine 16. Air is drawn into the vaporizing chamber 10 by the vacuum created by the engine. The air enters through an air inlet 48, as indicated by the arrows 50. As shown in FIG. 1, it is desirable to equip the air inlet 48 with an air filter 18 so that foreign particles in the incoming air will be prevented from entering and damaging the engine 16.

After air has entered the vaporizing chamber 10, it is constrained to follow a path in which the air closely passes over a reservoir of fuel 52 which is maintained in the bottom of the vaporizing chamber 10. The action of the incoming flow of air passing over the fuel 52 acts to mix the incoming air with vapors from the fuel. The extent to which the fuel 52 is vaporized is dependent upon a number of factors, including the amount and rate of the flow of air, the amount of and temperature of the liquid fuel present, and the surface area of the fuel presented in the chamber 10. It has been found in a preferred embodiment of this invention that a reservoir of fuel with a depth of approximately $\frac{1}{2}$ to $\frac{3}{4}$ inch and with a surface area of approximately 40 square inches has provided satisfactory vaporization of the fuel 52 when utilized in connection with a fuel spraying device, which is described in more detail below. Those skilled in the art will recognize, however, that these dimensions may be varied as appropriate to adjust the apparatus for a particular amount of vaporization to suit individual applications of the invention, according to various engine sizes, vehicle weights, load factors, atmospheric conditions, etc. The mixing of the air and fuel is further assisted by several additional features of the vaporizing chamber 10.

Mounted within the vaporizing chamber is a jet nozzle 54, which is connected, via fuel filter 22, to receive pressurized fuel from fuel inlet line 20. This pressurized fuel may be provided by a conventional fuel pump, as is typically used on automobile engines. The 3 to 6 pounds per square inch of pressure provided by such pumps is adequate to operate the jet nozzle 54. The jet nozzle 54 is arranged so that liquid fuel is sprayed into the swirl chamber 56, where the sprayed fuel mixes with the incoming air and rising vapors and is further vaporized. The incoming air is forced to circulate with a swirling motion within the swirl chamber 56 due to the placement of baffles 58 and 60, as indicated by the arrows 62. The angled lower end of the baffle 60 serves to further constrain the air to a swirling pattern. The swirling action of the air within the swirl chamber 56 significantly promotes additional vaporization of the fuel within the incoming air.

Although the size of the orifices within the jet nozzle 54 may be selected to correspond to the requirements of the particular engine on which this invention is to be utilized, it has been found that a nozzle having a number of orifices with diameters of approximately 0.016 inch provided suitable performance in one embodiment of this invention.

Some of the fuel sprayed from jet nozzle 54 will not initially vaporize, and this fuel is collected in the bottom of the vaporizing chamber 10 to form the reservoir of fuel 52, from which additional vaporization occurs. A float valve assembly 64, which may be made in accordance with any suitable conventional design, is adapted to maintain the level of fuel in the reservoir of fuel 52 at the desired level. As the level of fuel rises in the reservoir, float 66 also rises, causing a valve connected to plunger 68 to move away from its seat, thereby allowing excess fuel to drain out of the reservoir through fuel outlet line 24. The fuel outlet line 24 is connected via a return line to the low pressure side of the fuel pump (not shown) for the engine 16.

In the embodiment of this invention which is illustrated, an additional means is provided for heating the reservoir of fuel 52 in order to increase the vaporization of the liquid fuel. This heating is accomplished by means of tubing 26, which is affixed, as by soldering, for example, to the bottom of the vaporizing chamber 10. In this particular embodiment, heat is provided to the reservoir of fuel 52 by circulating the liquid coolant from the cooling system of the engine 16. The end 27 of the tubing 26 is connected to the pressure side of a radiator (not shown) for the engine 16. In this manner, liquid coolant, which has been heated by passing through the cooling passages of the engine 16, flows through the tubing 26 and heat is thereby transferred from the coolant to the reservoir of fuel 52. The end 72 of the tubing 26 is connected to a similar device for heating the vapor expander 12, as will be further described herein.

After passing out of the swirl chamber 56 by being drawn under the baffle 60, the vaporized fuel and air mixture is drawn out of the vaporizing chamber 10 through the outlet 74. As shown in FIG. 2, the vaporizing chamber 10 may be additionally provided with a perforated baffle 76 mounted within the outlet 74. Although this baffle is not believed to be essential to achieve the advantages of the invention, the baffle serves to promote vaporization of the fuel in the air and fuel mixture passing out of the vaporizing chamber 10.

Figure 3:
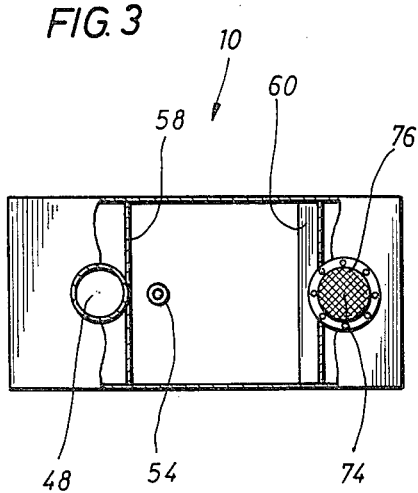
FIG. 3 is a plan view in partial cut-away of the vaporizing chamber of FIG. 2, along the lines 3—3 of FIG. 2.
Figure 4:
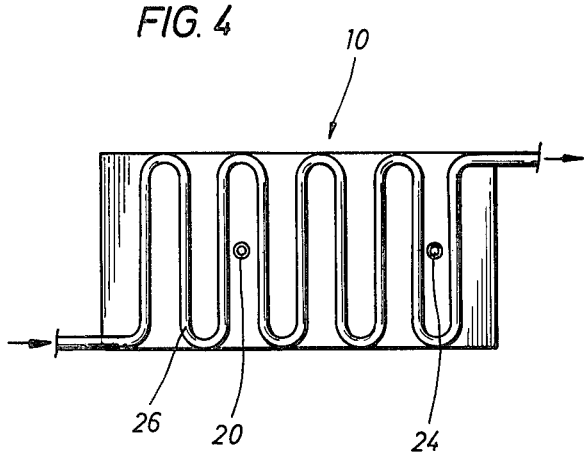
FIG. 4 is a view of the underside of the vaporizing chamber of FIG. 2, along the lines 4—4 of FIG. 2.

Now referring to FIGS. 3 and 4, a plan view in partial cutaway of the vaporizing chamber 10 of FIG. 2 is illustrated in FIG. 3. In this view, the relative positions of the air inlet 48, the outlet 74, the perforated baffle 76 within the outlet, the baffles 58 and 60, and the jet nozzle 54 are clearly delineated. In FIG. 4, a vertical view from below the vaporizing chamber 10 illustrates one manner in which the tubing 26 might be arranged on the vaporizing chamber 10 so as to provide a sufficient amount of heat transfer between the heated liquid coolant flowing through the tubing 26 and the reservoir of fuel 52 within the bottom of the vaporizing chamber 10. Also illustrated are the positions of the fuel inlet line 20 and the fuel outlet line 24, which have been discussed above.

Figure 5:
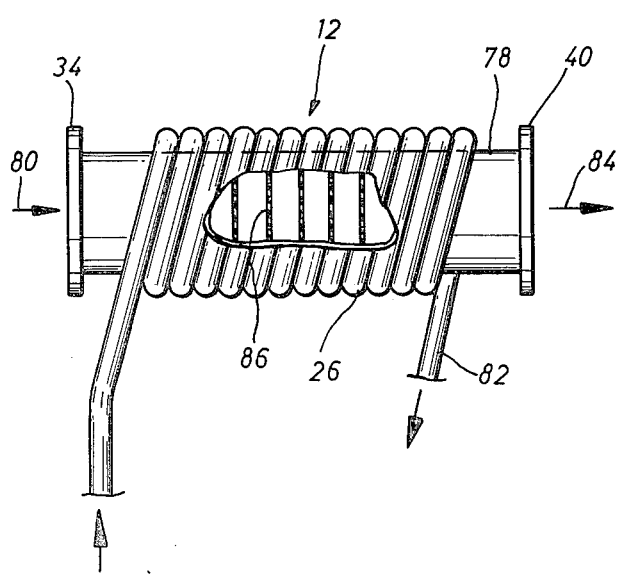
FIG. 5 is a side profile view in partial cut-away showing the vapor expander of the embodiment illustrated in FIG. 1.

Referring now to FIG. 5, a side view in partial cutaway is provided showing additional features of the vapor expander 12 illustrated in FIG. 1. The vapor expander 12 is used in this invention to provide additional heating of the fuel and air mixture so that the mixture is further vaporized before it is supplied to the engine 16. The vapor expander 12 includes a cylindrical tube 78 which is provided with a flange 34 at a first end and a flange 40 at a second end. Flanges 34 and 40 are provided for attaching the vapor expander 12 to connector 30 and metering device 14 respectively, as illustrated in FIG. 1.

When the tube 78 is thus connected, the fuel and air mixture from the vaporizing chamber 10 enters the tube 78 as indicated by arrow 80. As the mixture passes through the vapor expander 12, heat is transferred to the mixture from liquid coolant flowing within the tubing 26, which is coiled around the exterior of tube 78. As mentioned above, liquid coolant from the cooling system of the engine 16 is diverted through the tubing 26, where it first heats the reservoir of fuel 52 within the vaporizing chamber 10. The heated liquid coolant within the tubing 26 then passes through the tubing 26 where it is coiled around the tube 78, thereby providing for the transfer of heat to the air and fuel mixture within. From the end 82 of the tubing 26, the liquid coolant is returned to the cooling system of the engine 16. As will be appreciated by those skilled in the art, however, other heating devices may be employed in conjunction with the vapor expander.

The vapor expander 12 may be additionally provided with one or more perforated baffles 86, which are mounted within the tube 78 so that the fuel and air mixture must pass through the baffles in passing through the vapor expander 12. These baffles, although not considered essential to the invention, facilitate the heating and consequent vaporization of the mixture as it passes through the vapor expander 12. Although the dimensions of the vapor expander 12 may be varied to adapt the invention to engines of various sizes and fuel requirements, it has been found that a tube 78 having a diameter of approximately two to two and one-half inches and a length of approximately 15 inches has performed satisfactorily, while a 13 inch length of coiled tubing 26 has provided adequate heating for the vapor expander. After the mixture has been heated and further vaporized in the vapor expander 12, it is drawn out of the vapor expander 12, as indicated at arrow 84, and passes into the metering device 14, as indicated in FIG. 1.

Figure 6:
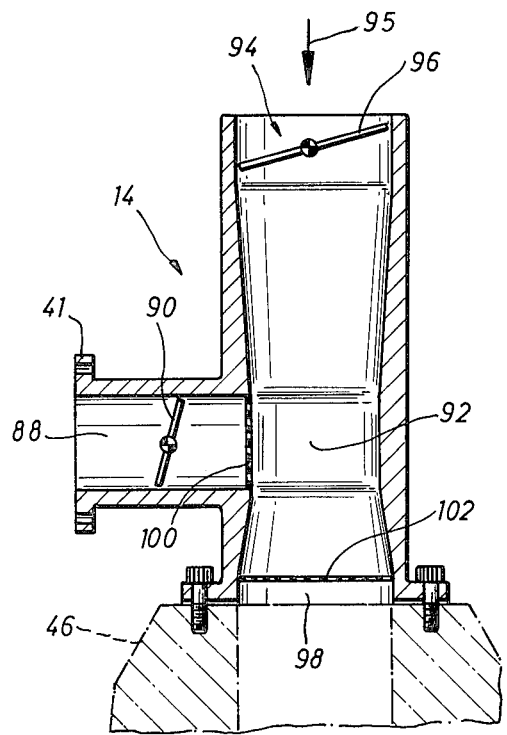
FIG. 6 is a side elevation in cross section showing the metering device of the embodiment illustrated in FIG. 1.

Now referring to FIG. 6, in conjunction with FIG. 1, the metering device 14 of this invention is illustrated in a cross sectional side elevation. It is contemplated that the metering device 14 may be a fabricated item made especially for use in this invention or may be a conventional carburetor which is modified to adapt it to the structure and function of the metering device 14. The metering device 14 is provided with a mixture inlet 88 to which is affixed a flange 41 so that the metering device 14 may be attached to the vapor expander 12, as illustrated in FIG. 1. When the vapor expander 12 and the metering device 14 are thus connected, the vaporized fuel and air mixture from the vapor expander 12 is drawn into the metering device 14 through the mixture inlet 88. Within the mixture inlet 88 is positioned a throttle valve 90. This valve is similar to the conventional butterfly type of throttle valve, such as that normally used on a carburetor, and is adapted to be connected to the throttle or accelerator linkage for the engine 16, thereby enabling the operator to control the amount of the vaporized fuel and air mixture which is permitted to enter the engine and consequently control the speed at which the engine 16 is permitted to run. From the mixture inlet 88, the air and fuel mixture passes into the venturi chamber 92, where the mixture is combined with additional air and then is drawn into the intake manifold of the engine 16. The venturi chamber 92 includes convex inner walls so that the chamber tapers from either end to a smaller cross sectional area in the center. Such a venturi chamber design is well known in the carburetor art and is provided as a means of lowering the pressure and increasing the velocity of the air and fuel mixture passing therethrough, thereby aiding in further vaporization of the mixture.

Additional air is provided for combining with the incoming fuel and air mixture by means of the air inlet 94, as indicated by arrow 95. This inlet may be equipped with an air filter, such as the air filter 42 illustrated in FIG. 1, so that foreign particles within the entering air are removed to prevent any harm to the internal parts of the engine 16. Mounted within the air inlet is choke valve 96. The choke valve 96 works in a manner similar to that of choke valves in conventional carburetors. The choke valve 96 is connected to a conventional choke mechanism, such as a manual choke control or a thermostatic automatic choke control, and used to facilitate cold starting of the engine 16. When the engine is cold, the choke valve 96 is closed, allowing a minimum amount of extra air to enter the mixture through the air inlet 94. Thus, the mixture is relatively "rich" for cold starting. As the engine warms up, the choke valve 96 is opened manually or automatically, so that the air and fuel mixture includes additional air from air inlet 94 and is thus made "leaner" or more fully vaporized for proper operation when the engine 16 has reached a normal operating temperature.

The air entering through air inlet 94, and the fuel and air mixture entering the metering device 14 through the mixture inlet 88, are combined in the venturi chamber 92 and then are drawn into the engine 16 through the mixture outlet 98. The highly vaporized fuel and air mixture is then ignited in the engine, the highly vaporized quality of this mixture promoting engine operation with increased efficiency, a minimum amount of polluting byproducts, and reduced long term maintenance.

Mesh screens 100 and 102 are provided within the mixture inlet 88 and the mixture outlet 98, respectively. These screens may be provided to act as flame arresters, so that if a backfire occurs within the engine 16, the backfire is prevented from spreading into the fuel delivery system of the engine. The screens 100 and 102 also serve to increase the vaporization of the fuel and air mixture passing through the metering device 14.

It is believed that the use of this invention on internal combustion engines will thus significantly improve the efficiency of such engines, help to reduce polluting byproducts of such engines, minimize the need for costly and complex pollution control devices, improve engine life, and reduce overall maintenance. It is contemplated that the invention may be utilized on presently existing engines as a replacement for conventional fuel delivery systems, as well as being integrated into the design of future engines as an original equipment component of such engines.

Although a typical embodiment of the present invention has been illustrated and discussed herein, numerous modifications and alternative embodiments of the apparatus and method of this invention will be apparent to those skilled in the art in view of this description. Accordingly, this description is to be construed as illustrative only and is provided for the purpose of teaching those skilled in the art the manner of constructing the apparatus and performing the method of the invention. It is to be understood that the forms of the invention shown and described herein are to be considered as the presently preferred embodiments. Various changes may be made in the configurations, sizes, arrangements, and number of component parts of the invention, as will be recognized by those skilled in the art, without departing from the scope of the invention. For example, equivalent elements might be substituted for those illustrated and described herein, parts or connections might be reversed or otherwise interchanged, and certain features of the invention might be utilized independently of the use of other features, all as will be apparent to one skilled in the art after receiving the benefit attained through reading the foregoing description of the invention.

What is claimed is:

1. A fuel vaporization and delivery system for an internal combustion engine, comprising:
   a vaporizing chamber having a first air inlet and a mixture outlet and further comprising
      a reservoir for storing a quantity of fuel wherein said first air inlet is positioned for providing for the passage of incoming air over said reservoir,
      a jet nozzle within said chamber and communicating with a source of pressurized fuel, for spraying fuel into said air and supplying fuel to said reservoir, the passage of air over said reservoir and the spraying of said fuel producing a fuel and air mixture,
      a first baffle disposed within said chamber between said first air inlet and said nozzle, and
      a second baffle disposed within said chamber between said nozzle and said outlet, said baffles adapted to produce a swirling motion in said mixture, thereby promoting the vaporization of said fuel;
   a metering device having a second air inlet for providing additional air to said mixture, the metering device communicating with said chamber and with said engine for controlling the amount of said mixture supplied to said engine; and
   an intermediate vapor expander including a heated region positioned between and in communication with said mixture outlet of said vaporizing chamber and said metering device for further vaporizing the fuel and air vapor mixture between the vaporizing chamber and the metering device.

2. A fuel vaporization and delivery system for an internal combustion engine, comprising:
   a vaporizing chamber for combining liquid fuel and air into an air and fuel mixture, said chamber including
      a reservoir for storing liquid fuel,
      an air inlet for drawing air over said reservoir,
      a jet nozzle communicating with a source of pressurized liquid fuel for spraying liquid fuel into said chamber, and
      a mixture outlet;
   a vapor expander communicating with said chamber for expanding and further vaporizing said mixture, said vapor expander including
      a tubular passage communicating with said chamber, and
      a heater associated with said passage for transferring heat to said mixture; and
   a metering device communicating with said expander and with said engine for controlling the amount of said mixture supplied to said engine, including
      a metering air inlet for providing additional air to said mixture,
      a controlled mixture outlet for conveying said mixture to said engine,
      a venturi chamber communicating between said inlet and said outlet for lowering the pressure and increasing the flow rate of said mixture,
      a choke valve mounted within said air inlet and adapted to control the flow of air through said inlet,
      a mixture inlet communicating with said vapor expander, and
      a mixture control valve mounted within said mixture inlet and adapted to control the flow of said mixture into said venturi chamber.

3. The system of claim 2, wherein said vaporizing chamber further comprises a reservoir heater affixed to said reservoir and adapted to heat said liquid fuel.

4. The system of claim 2, wherein said vaporizing chamber further comprises:
   a first baffle disposed within said chamber between said air inlet and said nozzle; and
   a second baffle disposed within said chamber between said nozzle and said outlet, said baffles being adapted to produce a swirling motion of said mixture, thereby promoting the vaporization of said fuel.

* * * * *